(12) United States Patent
Young, Jr. et al.

(10) Patent No.: US 11,610,218 B2
(45) Date of Patent: Mar. 21, 2023

(54) METHODS FOR DEVELOPING CUSTOMER LOYALTY PROGRAMS AND RELATED SYSTEMS AND DEVICES

(71) Applicant: Hypertherm, Inc., Hanover, NH (US)

(72) Inventors: Roger E. Young, Jr., West Lebanon, NH (US); Richard Adams, Norwich, VT (US); Phillip N. Parker, Hanover, NH (US)

(73) Assignee: Hypertherm, Inc., Hanover, NH (US)

( * ) Notice: Subject to any disclaimer, the term of this patent is extended or adjusted under 35 U.S.C. 154(b) by 0 days.

(21) Appl. No.: 15/359,880

(22) Filed: Nov. 23, 2016

(65) Prior Publication Data

US 2017/0124360 A1 May 4, 2017

Related U.S. Application Data

(63) Continuation of application No. 14/219,665, filed on Mar. 19, 2014, now abandoned.

(51) Int. Cl.
*G06Q 30/00* (2023.01)
*G06Q 30/0226* (2023.01)
(Continued)

(52) U.S. Cl.
CPC ....... *G06Q 30/0226* (2013.01); *B23K 26/702* (2015.10); *B26F 3/004* (2013.01);
(Continued)

(58) Field of Classification Search
CPC .......... G06Q 30/0277; G06Q 30/0269; G06Q 30/02; G06Q 30/0226; B23K 26/702;
(Continued)

(56) References Cited

U.S. PATENT DOCUMENTS

| 2,985,050 A | 5/1961 | Schwacha |
| 3,010,012 A | 11/1961 | Tuthill |

(Continued)

FOREIGN PATENT DOCUMENTS

| CA | 2439213 C | 10/2006 |
| EP | 0508482 A2 | 10/1992 |

(Continued)

OTHER PUBLICATIONS

Ramakrishnan; Plasma_generation_for_the_plasma_cutting_process; IEEE 1997; pp. 937-946; 1997.*

(Continued)

*Primary Examiner* — Radu Andrei
(74) *Attorney, Agent, or Firm* — Cesari and McKenna, LLP (57) ABSTRACT

In some aspects, methods for measuring a level of usage of one or more replaceable consumable components within a material processing system can include detecting a type of consumable component in use within a processing device of the material processing system; determining, using a computing system, if the type of consumable component in use is a specific type of consumable component; and determining, using the computing system, a usage ratio of the specific type of consumable component used relative to other types of consumable components used within the processing device during a cumulative time period of use of the material processing system.

14 Claims, 5 Drawing Sheets

(51) Int. Cl.
*H04W 4/21* (2018.01)
*H04L 67/50* (2022.01)
*B23K 26/70* (2014.01)
*B26F 3/00* (2006.01)
*G06K 7/10* (2006.01)
*H04L 67/10* (2022.01)
*H05H 1/36* (2006.01)

(52) U.S. Cl.
CPC .......... *G06K 7/10009* (2013.01); *H04L 67/10* (2013.01); *H04L 67/535* (2022.05); *H04W 4/21* (2018.02); *H05H 1/36* (2013.01)

(58) Field of Classification Search
CPC ...... H04W 4/21; B26F 3/004; G06K 7/10009; H04L 67/10; H04L 67/22; H05H 1/36
See application file for complete search history.

(56) References Cited

U.S. PATENT DOCUMENTS

| | | |
|---|---|---|
| 3,018,360 A | 1/1962 | Engel |
| 3,518,401 A | 6/1970 | Mathews |
| 3,602,683 A | 8/1971 | Hishida et al. |
| 4,125,754 A | 11/1978 | Wasserman et al. |
| 4,497,029 A | 1/1985 | Kiyokawa |
| 4,519,835 A | 5/1985 | Gauvin et al. |
| 4,588,880 A | 5/1986 | Hesser |
| 4,733,052 A | 3/1988 | Nilsson et al. |
| 4,742,470 A | 5/1988 | Juengel |
| 4,929,811 A | 5/1990 | Blankenship |
| 5,018,670 A | 5/1991 | Chalmers |
| 5,050,106 A | 9/1991 | Yamamato et al. |
| 5,086,655 A | 2/1992 | Fredericks et al. |
| 5,099,226 A | 3/1992 | Andrews |
| 5,248,867 A | 9/1993 | Ohba et al. |
| 5,309,683 A | 5/1994 | Hockett |
| 5,357,076 A | 10/1994 | Blankenship |
| 5,381,487 A | 1/1995 | Shamos |
| 5,388,965 A | 2/1995 | Fehn |
| 5,390,964 A | 2/1995 | Gray, Jr. |
| 5,400,389 A | 3/1995 | Niiyama et al. |
| 5,440,477 A | 8/1995 | Rohrberg et al. |
| 5,500,512 A | 3/1996 | Goldblatt |
| 5,556,562 A | 9/1996 | Sorenson |
| 5,643,058 A | 7/1997 | Erichsen et al. |
| 5,653,264 A | 8/1997 | Atkinson |
| 5,717,187 A | 2/1998 | Rogozinski et al. |
| 5,860,849 A | 1/1999 | Miller |
| 5,994,663 A | 11/1999 | Lu |
| 6,047,579 A | 4/2000 | Schmitz |
| 6,130,407 A | 10/2000 | Villafuerte |
| 6,133,542 A | 10/2000 | Dvorak et al. |
| 6,201,207 B1 | 3/2001 | Maruyama et al. |
| 6,248,975 B1 | 6/2001 | Lanouette et al. |
| 6,259,059 B1 | 7/2001 | Hsu |
| 6,267,291 B1 | 7/2001 | Blankenship et al. |
| 6,326,583 B1 | 12/2001 | Hardwick et al. |
| 6,409,476 B2 | 6/2002 | Mills |
| 6,479,793 B1 | 11/2002 | Wittmann et al. |
| 6,510,984 B2 | 1/2003 | Blankenship et al. |
| 6,539,813 B1 | 4/2003 | Horiuchi et al. |
| 6,563,085 B2 | 5/2003 | Lanouette et al. |
| 6,657,162 B1 | 12/2003 | Jung et al. |
| 6,659,098 B1 | 12/2003 | Sekiya |
| 6,693,252 B2 | 2/2004 | Zhang et al. |
| 6,707,304 B2 | 3/2004 | Buhler et al. |
| 6,717,096 B2 | 4/2004 | Hewett et al. |
| 6,729,468 B1 | 5/2004 | Dobmeier |
| 6,772,040 B1 | 8/2004 | Picard et al. |
| 6,781,085 B2 | 8/2004 | Ulrich et al. |
| 6,933,462 B2 | 8/2005 | Iriyama et al. |
| 6,960,737 B2 | 11/2005 | Tatham |
| 6,980,704 B2 | 12/2005 | Kia et al. |
| 6,992,262 B2 | 1/2006 | Matus et al. |
| 6,995,545 B2 | 2/2006 | Tracy et al. |
| 7,030,337 B2 | 4/2006 | Baker et al. |
| 7,032,814 B2 | 4/2006 | Blankenship |
| 7,115,833 B2 | 10/2006 | Higgins et al. |
| 7,186,944 B2 | 3/2007 | Matus et al. |
| 7,307,533 B2 | 12/2007 | Ishii |
| 7,358,458 B2 | 4/2008 | Daniel |
| 7,375,302 B2 | 5/2008 | Twarog et al. |
| 7,411,154 B2 | 8/2008 | Fosbinder et al. |
| 7,645,960 B2 | 1/2010 | Stava |
| 7,651,269 B2 | 1/2010 | Comendant |
| 7,671,294 B2 | 3/2010 | Belashchenko et al. |
| 7,680,625 B2 | 3/2010 | Trowbridge et al. |
| 7,755,484 B2 | 7/2010 | Cullen et al. |
| 7,843,334 B2 | 11/2010 | Kumagai et al. |
| 3,035,487 A1 | 10/2011 | Malackowski |
| 8,085,150 B2 | 12/2011 | Oberle |
| 8,141,240 B2 | 3/2012 | Hiew et al. |
| 8,203,095 B2 | 6/2012 | Storm et al. |
| 8,204,618 B2 | 6/2012 | Young, Jr. et al. |
| 8,242,907 B2 | 8/2012 | Butler et al. |
| 8,263,896 B2 | 9/2012 | Schneider |
| 8,272,794 B2 | 9/2012 | Silchenstedt et al. |
| 8,278,588 B2 | 10/2012 | Salsich et al. |
| 8,316,742 B2 | 11/2012 | Craig |
| 8,373,084 B2 | 2/2013 | Salsich |
| 8,376,671 B2 | 2/2013 | Kaneko |
| 8,395,076 B2 | 3/2013 | Matus |
| 8,431,862 B2 | 4/2013 | Kachline |
| 8,620,738 B2 | 12/2013 | Fordyce, III et al. |
| 8,658,941 B2 | 2/2014 | Albrecht |
| 8,686,318 B2 | 4/2014 | Albrecht |
| 8,748,776 B2 | 6/2014 | Albrecht |
| 8,759,715 B2 | 6/2014 | Narayanan et al. |
| 8,766,132 B2 | 7/2014 | Blankenship et al. |
| 8,859,828 B2 | 10/2014 | Liu et al. |
| 8,859,928 B2 | 10/2014 | Sommerfeld |
| 9,031,683 B2 | 5/2015 | Itrom et al. |
| 9,129,330 B2 | 9/2015 | Albrecht et al. |
| 9,229,436 B2 | 1/2016 | Stumpfl et al. |
| 10,314,155 B2 | 6/2019 | Patel et al. |
| 10,321,551 B2 | 6/2019 | Zhang et al. |
| 10,346,647 B2 | 7/2019 | Hoffa et al. |
| 2002/0022990 A1* | 2/2002 | Kurata ................. B41J 2/17503 705/14.36 |
| 2002/0117484 A1 | 8/2002 | Jones et al. |
| 2002/0194064 A1* | 12/2002 | Parry ................. G06Q 30/0223 705/14.24 |
| 2003/0025598 A1 | 2/2003 | Wolf et al. |
| 2003/0094487 A1 | 5/2003 | Blankenship et al. |
| 2003/0148709 A1 | 8/2003 | Anand et al. |
| 2004/0004064 A1 | 1/2004 | Lanouette et al. |
| 2004/0031776 A1 | 2/2004 | Gevelber et al. |
| 2004/0106101 A1 | 6/2004 | Evans |
| 2004/0193307 A1 | 9/2004 | Fujishima et al. |
| 2005/0035093 A1 | 2/2005 | Yamaguchi |
| 2005/0045599 A1 | 3/2005 | Matus |
| 2005/0109738 A1 | 5/2005 | Hewett et al. |
| 2005/0145688 A1 | 7/2005 | Milenkovic et al. |
| 2005/0172118 A1* | 8/2005 | Nasu ..................... G03G 21/04 399/24 |
| 2005/0173390 A1 | 8/2005 | Lanouette et al. |
| 2006/0006154 A1 | 1/2006 | Koike |
| 2006/0070986 A1 | 4/2006 | Ihde et al. |
| 2006/0125864 A1* | 6/2006 | Westrum ............. B41J 2/17546 347/14 |
| 2006/0163216 A1 | 7/2006 | Brandt et al. |
| 2006/0163228 A1 | 7/2006 | Daniel |
| 2006/0163230 A1 | 7/2006 | Kaufman |
| 2006/0201923 A1 | 9/2006 | Hutchison |
| 2006/0289406 A1 | 12/2006 | Helenius et al. |
| 2007/0012099 A1 | 1/2007 | Becourt |
| 2007/0080149 A1 | 4/2007 | Albrecht |
| 2007/0080151 A1 | 4/2007 | Albrecht |
| 2007/0080152 A1 | 4/2007 | Albrecht |
| 2007/0080153 A1 | 4/2007 | Albrecht et al. |
| 2007/0193988 A1* | 8/2007 | De Joannis De Verclos ............... B23K 26/08 219/121.78 |

(56) References Cited

U.S. PATENT DOCUMENTS

| | | |
|---|---|---|
| 2007/0210034 A1 | 9/2007 | Mather et al. |
| 2007/0294608 A1 | 12/2007 | Winterhalter et al. |
| 2008/0001752 A1 | 1/2008 | Bruns |
| 2008/0011821 A1 | 1/2008 | Ellender et al. |
| 2008/0023451 A1 | 1/2008 | Salsich et al. |
| 2008/0061049 A1 | 3/2008 | Albrecht |
| 2008/0066596 A1 | 3/2008 | Yamaguchi |
| 2008/0083711 A1 | 4/2008 | Twarog et al. |
| 2008/0093476 A1 | 4/2008 | Johnson et al. |
| 2008/0118253 A1* | 5/2008 | Abe .......... G03G 15/0855 399/12 |
| 2008/0149608 A1 | 6/2008 | Albrecht |
| 2008/0149686 A1 | 6/2008 | Daniel et al. |
| 2008/0156783 A1 | 7/2008 | Vanden Heuvel |
| 2008/0217305 A1 | 9/2008 | Sanders |
| 2008/0223952 A1 | 9/2008 | Wernli et al. |
| 2008/0257874 A1 | 10/2008 | Kaufman et al. |
| 2008/0308641 A1 | 12/2008 | Finn |
| 2009/0008370 A1 | 1/2009 | Salsich et al. |
| 2009/0057286 A1 | 3/2009 | Ihara et al. |
| 2009/0065489 A1 | 3/2009 | Duffy |
| 2009/0078196 A1* | 3/2009 | Midorikawa ...... H01L 21/3065 118/75 |
| 2009/0107960 A1 | 4/2009 | Hampton |
| 2009/0152255 A1 | 6/2009 | Ma |
| 2009/0159572 A1 | 6/2009 | Salsich |
| 2009/0159575 A1 | 6/2009 | Salsich |
| 2009/0163130 A1 | 6/2009 | Zambergs |
| 2009/0184098 A1 | 7/2009 | Daniel et al. |
| 2009/0195364 A1* | 8/2009 | Edwards ............ B41J 2/1752 340/10.5 |
| 2009/0212027 A1 | 8/2009 | Borowy |
| 2009/0219136 A1 | 9/2009 | Brunet et al. |
| 2009/0222804 A1 | 9/2009 | Kaufman |
| 2009/0230097 A1 | 9/2009 | Liebold et al. |
| 2009/0240368 A1 | 9/2009 | Young, Jr. et al. |
| 2009/0288532 A1 | 11/2009 | Hashish |
| 2009/0312862 A1 | 12/2009 | Fagan |
| 2010/0046210 A1* | 2/2010 | Mathai ............... F21K 9/232 362/147 |
| 2010/0078408 A1 | 4/2010 | Liebold et al. |
| 2010/0084381 A1 | 4/2010 | Indraczek et al. |
| 2010/0155377 A1 | 6/2010 | Lindsay et al. |
| 2010/0314361 A1* | 12/2010 | Buccella ............. B23K 10/00 219/121.39 |
| 2010/0324868 A1 | 12/2010 | Russell et al. |
| 2011/0000893 A1 | 1/2011 | Blankenship et al. |
| 2011/0029385 A1 | 2/2011 | Engel et al. |
| 2011/0114616 A1 | 5/2011 | Albrecht |
| 2011/0163857 A1 | 7/2011 | August et al. |
| 2011/0220630 A1 | 9/2011 | Speilman et al. |
| 2011/0294401 A1 | 12/2011 | Habermann et al. |
| 2012/0021676 A1 | 1/2012 | Schubert et al. |
| 2012/0138583 A1 | 6/2012 | Winn et al. |
| 2012/0139692 A1 | 6/2012 | Neubauer et al. |
| 2012/0234803 A1 | 9/2012 | Liu et al. |
| 2012/0241428 A1 | 9/2012 | Kowaleski |
| 2012/0247293 A1 | 10/2012 | Nagai et al. |
| 2013/0001221 A1 | 1/2013 | Lambert |
| 2013/0068732 A1 | 3/2013 | Watson et al. |
| 2013/0087537 A1 | 4/2013 | Barnett et al. |
| 2013/0167697 A1 | 7/2013 | Reukers |
| 2013/0179241 A1 | 7/2013 | Liu |
| 2013/0210319 A1 | 8/2013 | Gramling et al. |
| 2013/0253728 A1 | 9/2013 | Stumpfl et al. |
| 2013/0263420 A1 | 10/2013 | Shipulski |
| 2013/0264317 A1 | 10/2013 | Hoffa et al. |
| 2013/0264320 A1 | 10/2013 | Shipulski et al. |
| 2014/0029178 A1 | 1/2014 | Trudeau, Jr. et al. |
| 2014/0061170 A1 | 3/2014 | Lindsay et al. |
| 2014/0069895 A1 | 3/2014 | Brine et al. |
| 2014/0113527 A1 | 4/2014 | Lindsay et al. |
| 2014/0165807 A1 | 6/2014 | David et al. |
| 2014/0170935 A1 | 6/2014 | Maurer |
| 2014/0235140 A1 | 8/2014 | Maurer |
| 2014/0335761 A1 | 11/2014 | Chou et al. |
| 2015/0108223 A1 | 4/2015 | Weitzhandler |
| 2015/0127137 A1 | 5/2015 | Brandt et al. |
| 2015/0196989 A1 | 7/2015 | Hashish et al. |
| 2015/0251267 A1 | 9/2015 | Winn et al. |
| 2015/0251331 A1 | 9/2015 | Vandergon et al. |
| 2015/0332071 A1 | 11/2015 | Hoffa et al. |
| 2015/0371129 A1 | 12/2015 | Hoffa et al. |
| 2016/0221108 A1 | 8/2016 | Hoffa et al. |
| 2016/0230763 A1 | 8/2016 | Ignatiev et al. |
| 2017/0042011 A1 | 2/2017 | Sanders et al. |
| 2017/0042012 A1 | 2/2017 | Sanders et al. |
| 2017/0046544 A1 | 2/2017 | Ikemoto |
| 2018/0099378 A1 | 4/2018 | Hashish et al. |
| 2018/0257253 A1 | 9/2018 | Vandergon et al. |
| 2019/0344466 A1 | 11/2019 | Vandergon et al. |

FOREIGN PATENT DOCUMENTS

| | | |
|---|---|---|
| EP | 1117279 A1 | 7/2001 |
| EP | 1288016 A | 3/2003 |
| JP | 6163368 A | 4/1986 |
| JP | H05154732 A | 6/1993 |
| JP | H11285831 A | 10/1999 |
| JP | 2003025176 A | 1/2003 |
| JP | 2003048134 A | 2/2003 |
| JP | 2009252085 A | 10/2009 |
| JP | 2012048287 A | 3/2012 |
| JP | 2012079221 A | 4/2012 |
| WO | 2008144785 A1 | 12/2008 |
| WO | 2010142858 A1 | 12/2010 |
| WO | 2013000700 A1 | 1/2013 |
| WO | 2013151886 A2 | 10/2013 |

OTHER PUBLICATIONS

Wang; Plasma_arc_cutting_torch_tracking_control; IEEE 2000; pp. 345-350; 2000.*

Torchmate Arc Voltage Torch Height Control—Operation Manual, Applied Robotics, Inc., Oct. 2005, pp. 1-19.

Trumpf Press Release, New RFID lens provides LensLine sensor system with improved condition checking capabilities, online press release available at http://www.trumpf.com/nc/en/press/press-releases/press-release/rec-uid/266044.html, Aug. 12, 2013. (4 pages).

* cited by examiner

METHODS FOR DEVELOPING CUSTOMER LOYALTY PROGRAMS AND RELATED SYSTEMS AND DEVICES

CROSS REFERENCE TO RELATED APPLICATION

This application is a continuation of U.S. Ser. No. 14/219,665, filed Mar. 19, 2014, the entire contents of which are owned by the assignee of the instant application and incorporated herein by reference in their entirety.

TECHNICAL FIELD

This disclosure relates generally to material processing systems, and more specifically to methods for developing customer loyalty programs and related systems and devices.

BACKGROUND

Material processing systems, such as thermal processing torches (e.g., plasma arc torches), are used in the heating, cutting, gouging, and marking of materials. Typically, a plasma arc torch includes multiple replaceable consumable components, which can include an electrode mounted within a torch body, a swirl ring, a nozzle, one or more retaining caps, and a shield. The nozzle typically has an exit orifice, electrical connections, passages for cooling, and passages for arc control fluids (e.g., plasma gas). Optionally, the swirl ring can be used to control fluid flow patterns in the plasma chamber formed between the electrode and the nozzle. In some torches, a retaining cap can be used to position the nozzle and/or swirl ring in the plasma arc torch.

In operation, the torch produces a plasma arc, which is a constricted jet of an ionized gas with high temperature and sufficient momentum to assist with removal of molten metal. Each consumable can be selected to achieve optimal performance (e.g., an optimal current level, maximum lifespan, etc.) in view of specific processing constraints, such as the type of material being cut and/or the cut shape desired. Installing incorrect consumables into a torch can result in poor cut quality and decreased cut speed. In addition, incorrect consumables can reduce consumable life and lead to premature consumable failure. Additionally, in some cases, it can be difficult for a third party torch system manufacturer to guarantee performance of its systems if aftermarket consumables (e.g., consumables not manufactured or otherwise authorized by the system manufacturer) are used in the torch system by user without the manufacturer's knowledge or approval.

Other types of material processing systems, such as water jet processing systems or laser processing systems also typically include various consumable components that are used to operate their respective processing devices (e.g., water-jet cutting heads and laser cutting heads).

SUMMARY

In some aspects, methods for validating customer characteristics associated with a user's usage of one or more replaceable consumable components within a material processing system can include detecting, using a computing system, a usage of the one or more replaceable consumable components within the material processing system; obtaining, over a communication network, a usage metric for the material processing system from the computing system, the usage metric for the material processing system being associated with the one or more replaceable consumable components used within the material processing system and based on identification of the consumable components installed in the material processing system during operation; comparing, using the computing system, the usage metric to a threshold usage metric; and determining, based on the comparing the usage metric to a threshold usage metric, if the user's usage indicates a selected level of customer usage.

Embodiments can include one or more of the following features.

The obtaining the usage metric can include determining a frequency of use of a particular type (e.g., manufacturer or OEM or channel source) of consumable. The comparing the usage metric can include determining a ratio that the particular type of consumable component is used relative to a total usage of the material processing system. The comparing the usage metric can include determining (e.g., by periodically tracking) whether or not a consumable component of a predetermined type is installed in the material processing system during usage. For example, the determining whether or not a consumable component of the predetermined type is installed within the material processing system during usage can include identifying the consumable component installed in the material processing system by communicating with a signal device disposed in or on the consumable component. The obtaining the usage metric can include communicating with the consumable component during use. For example, communicating with the consumable component during use can include obtaining system operating parameters of one or more uses of the material processing system. The method can also include, responsive to determining that the user's usage indicates a predetermined level of customer usage, providing a user with one or more benefits. The method can also include receiving information relating to usage of the processing device during one or more previous operation sequences.

In some aspects, methods for measuring a level of usage of one or more replaceable consumable components within a material processing system can include detecting a type of consumable component in use within a processing device of the material processing system; determining, using a computing system, if the type of consumable component in use is a specific type of consumable component; and determining, using the computing system, a usage ratio of the specific type of consumable component used relative to other types of consumable components used within the processing device during a cumulative time period of use of the material processing system.

Embodiments can include one or more of the following features.

The determining the usage ratio can include transferring information regarding the type of consumable component in use to an external computing device (e.g., the third party client device, the communication networks, or another computing device) that is configured to determine the usage ratio. The detecting the type of consumable component can include communicating with a signal device disposed in or on the consumable component. The specific type of consumable component can include a particular manufacturer or OEM type or channel source. The determining the usage ratio can include determining a frequency of use of the specific type (e.g., a manufacturer, an original equipment manufacturer (OEM), or a channel source) of consumable component relative to a frequency of use of consumable components that are not of the specific type. The determining the usage ratio can include repeatedly determining (e.g., periodically tracking) whether or not a consumable component of the specific type is installed in the material processing system during usage. For example, the determining whether or not a consumable component of the specific type is installed in the material processing system during usage can include communicating with a signal device disposed in or on the consumable component. The method can also include supplying information relating to usage of the processing device to the material processing system.

In some aspects, material processing systems can include a material processing system control unit configured to be operably connected to a processing device (e.g., a plasma torch); a consumable identification module in communication with the control unit, the consumable identification module being configured to detect a type of consumable component in use within a processing device of the material processing system; a usage tracking module in communication with the control unit, the usage tracking module configured to determine a usage ratio of a predetermined type of consumable component used within the processing device relative to other types of consumable components used within the processing device during a cumulative time period of use of the material processing system; and a communication module in communication with the control unit, the communication module being configured to provide over a communication network information regarding a usage ratio of the predetermined type of consumable component used within the material processing system.

Embodiments can include one or more of the following features.

The consumable identification module can include a communication device configured to communicate with a consumable component during use. For example, the consumable identification module can be disposed within the material processing device and can be configured to communicate with a data tag disposed in or on the consumable component, where the data tag can include identifying information relating to the consumable component. The communication module can be configured to transmit information relating to the consumable component to the communication network. The communication network can include an Internet based cloud system configured to transmit material processing system usage information relating to the type of consumable components used to the third party. The communication network can alternatively or additionally include a mobile telecommunication system (e.g., a 3G antenna disposed on the material processing system power supply) configured to transmit material processing system usage information relating to the type of consumable components used to the third party.

Embodiments described herein can have one or more of the following advantages.

In some aspects, the systems and methods described herein can be used to enable a third party (e.g., a manufacturer, seller, reseller, original equipment manufacturer (OEM), or other similar party) that makes or sells one or more components of a material processing system (e.g., power supplies, torches, consumable components (e.g., consumables), etc.) to monitor and manage the use of their products by an end user in a more efficient manner than possible with some other systems. For example, the systems and methods described herein can generally permit the third party to track, monitor, or verify if and when a specific type (e.g., a preferred type (e.g., a certain brand or manufacturer)) of consumable components is installed and/or in use in the material processing system relative to other types (e.g., non-preferred types) of consumable components. In some embodiments, this may enable verification of matched installation and/or usage of consumables in or with a power supply (e.g., installation of a third party's consumables on the same third party's power supply). In some cases, as discussed herein, a third party may manufacture and/or sell both power supplies and consumable components and the verification of the matched consumables with a power supply can be used for quality or troubleshooting purposes. Additionally or alternatively, in some examples, the type of the processing device itself (e.g., a manufacturer or brand of a torch) being used with the material processing system can also be identified by a third party to track, monitor, or verify if and when a specific type of torch is used.

Based on information obtained about the user's usage of the preferred types of consumable components, the third party can offer beneficial treatments to the user. For example, the third party and the user can agree that if the user uses the preferred type of consumable components a certain amount of usage time (e.g., for over 90% (e.g., 100%) of operations while using the preferred type), the third party will provide products or services to the user at discounted or reduced costs. In some cases, the third party may provide the user with discounted (e.g., free) components of the material processing system (e.g., a torch or a power supply of a thermal torch processing system) if the user uses only the preferred type of consumable components (e.g., consumable components manufactured by the third party).

Additionally, using material processing systems with consumable components having signal devices (e.g., RFID data tags) can enable the third party to monitor the user's usage more easily and more accurately than with some other material processing systems. For example, in some cases, third parties can monitor and track what types of consumables are being used in a user's system automatically using any of various communications systems. Whereas, with some other types of material processing systems, a third party may need to rely on reports provided by the user (or other possibly inconclusive or inaccurate methods) in order to determine if the user is using the preferred type of consumable components in accordance with an agreement between the user and the third party.

DETAILED DESCRIPTION

In some aspects, material processing systems (e.g., thermal processing systems, water jet processing systems, etc.)

can include components and systems that enable monitoring and tracking different types of consumable components that are used within the material processing system. By monitoring the types of consumables used by the material processing systems, third parties can execute various customer service programs to offer one or more beneficial treatments to users depending on their use of products from the third party.

Figure 1:
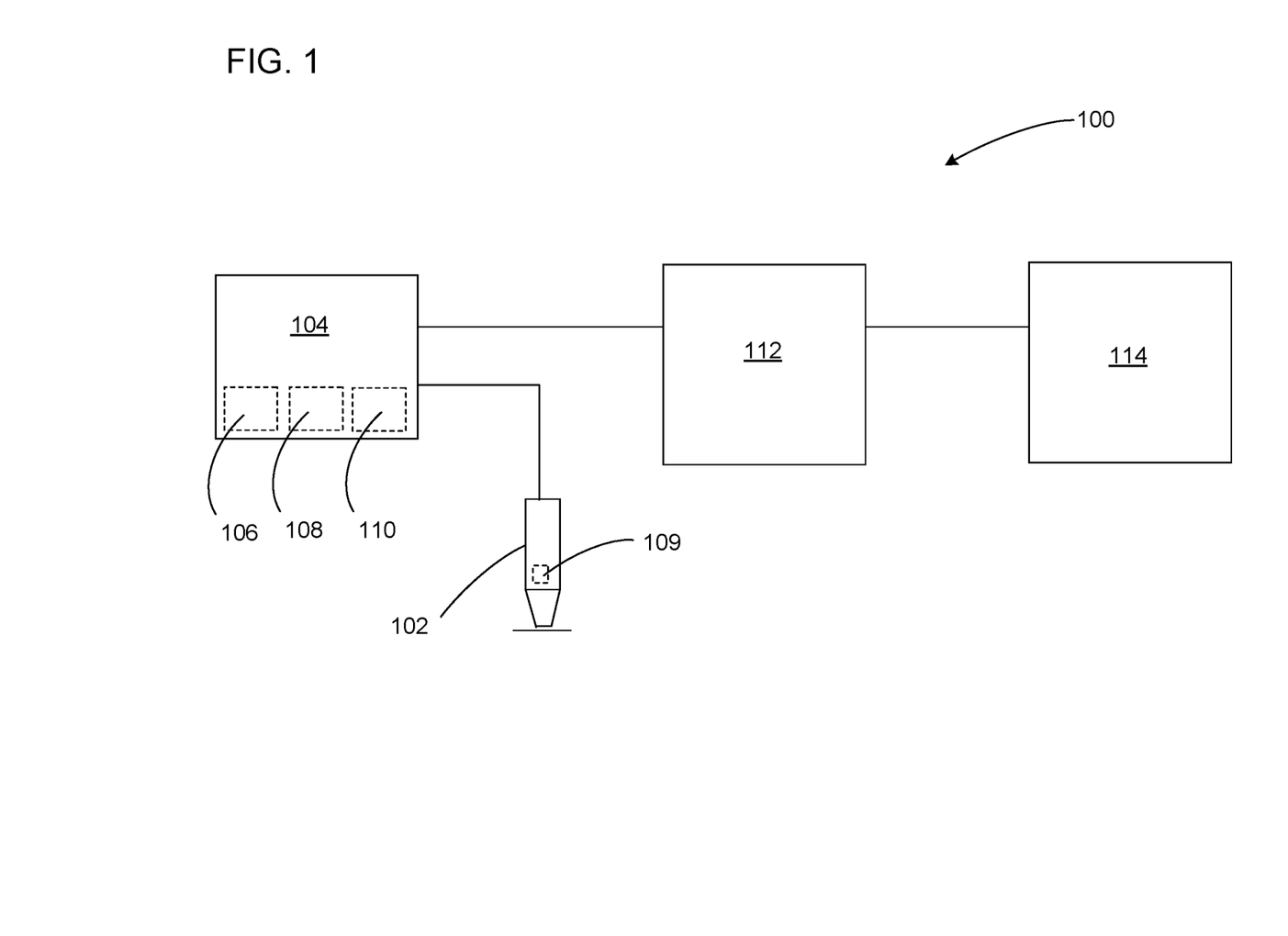
FIG. 1 is a schematic diagram of an example material processing system having a communication network to transmit usage information to a third party.

Referring to FIG. 1, a material processing system (e.g., a thermal torch system (e.g., a plasma arc torch system), a water-jet processing system, a laser processing system, or other material processing system) 100 generally includes a processing device (e.g., a torch device (e.g., a handheld torch or a mechanized or automated torch)) 102 that is operably connected to a material processing system power supply 104 to receive electrical power and gas (e.g., pilot gas or cutting gas) for operation. In examples in which the material processing system 100 is in the form of a water-jet processing system, the processing device 102 can include a water-jet cutting head. In examples in which the material processing system 100 is in the form of a laser processing system, the processing device 102 can include a laser cutting head. Similarly, the power supply 104 can alternatively or additionally provide other connections to the processing device, for example to provide water to a water-jet cutting head or to provide electricity to a laser cutting head.

During use, the processing device (e.g., torch) 102 can generate a cutting beam or arc (e.g., a plasma arc from a torch) for cutting a workpiece (e.g., a metal plate-like workpiece) when the processing device 102 is connected to the power supply 104. The torch 102 generally includes a torch body that defines a plasma gas flow path for directing a plasma gas to a plasma chamber in which a plasma arc is formed. An electrode (not shown) can be disposed within the torch body for generating the plasma arc. The torch 102 typically includes one or more consumable components (e.g., an electrode, a nozzle, a shield, and one or more retaining caps) that can be used to direct gas flow, to generate a plasma arc, and to protect torch components during use. Other types of material processing systems can also include various consumable components. For example, water-jet processing systems can include various consumable components, such as an orifice, an orifice plate, a nozzle, or a pump device. Similarly, laser processing systems can include various consumable components, such as one or more lenses or nozzles.

The power supply 104 includes a control unit (e.g., a microprocessor) 106 that is configured to control the operation of the power supply 104 and the torch (or other processing device) 102 during use. The control unit 106 is also configured to communicate with other components (e.g., modules) of the material processing system, which can be part of the power supply 104. For example, the power supply 104 can also include a usage tracking module 108 and/or a communication module 110. It is noted that in some embodiments, the control unit 106, the usage tracking module 108, and/or the communication module 110 can be formed as separate modules or components in communication with one another or one or more components having multiple functionalities of one or more of these modules.

As discussed below, the usage tracking module 108 can be in communication with the control unit 106 and a consumable identification module (e.g., a consumable identification module arranged in or on the torch 102) 109 to track or monitor what types of consumable components are installed and used in the torch 102.

The communication module 110 can be configured to communicate (e.g., via wired or wireless communication) with the control unit 106, the usage tracking module 108, and/or the consumable identification module 109 disposed in the torch 102.

Additionally, one or more components of the power supply (e.g., the communication module 110 or the control unit 106) are typically in communication (e.g., wired communication or wireless communication) with a communication network (e.g., a communication system) 112 that is configured to provide information about the material processing system to a third party 114. The third party 114 can include a person (e.g., a serviceperson, a machine operator, a representative of the manufacturer of the material processing system, power supply, torch or consumable component). For example, the information can include information about the processing device, such as information regarding the type of consumable component (e.g., brand or manufacturer information) installed in the torch (or other type of processing device) 102 during one or more usages of the torch. Additionally or alternatively, as mentioned above, the type of the processing device itself (e.g., a manufacturer or brand of a torch) being used with the material processing system can also be monitored and identified by a third party. In some examples, the communication network is configured to provide information regarding a type of consumable component used within the material processing system. In some embodiments, the communication network can include a local area network (LAN) in communication with the power supply 104 and/or the third party 114.

The power supply 104 is typically configured to communicate with a consumable component during use, for example, using a consumable identification module 109 arranged in one or more system components. In some embodiments, the consumable identification module 109 can communicate with the consumable component installed in the system and also with the control unit 106 or another component of the power supply 104. Therefore, the material processing system can obtain information regarding the consumable component (e.g., identifying information) using the consumable identification module 109 and transmit the information to the third party 114, for example, via the control unit 106, the communication module 110, and the communication network 112. In some cases, usage of the power supply 104 may additionally or alternatively be monitored and verified so that it can be provided (e.g., reported) to the third party 114. Monitored usage of the power supply 104 can be used to enable the third party to determine an amount of use (e.g., a percentage of use) of the preferred type consumables associated with the power supply 104.

In some examples, the consumable identification module 109 is configured to communicate with a data tag (e.g., a radio-frequency identification (RFID) device) disposed in or on one or more of the consumable components installed in the torch (or other processing device) 102. For example, the consumable identification module 109 can include a data reading device (e.g., an RFID reading device) disposed within one or more components of the material processing system (e.g., the torch 102, the power supply 104, the control unit 106, or the communication network 112) that is configured to communicate with the data tag disposed in or on one or more of the consumable components. In some cases, the data tag can include identifying information relating to the consumable component, which can be read by the consumable identification module 109 so that the consumable component can be identified, for example, to determine if the consumable is a specific or preferred type (e.g., a particular brand or manufacturer). As discussed below, the identifying information can be used by a third party 114 in communication with the communication network 112 to enable any number of various customer service programs based on the user's usage of the preferred type of consumable component. As mentioned above, the material processing system can also be configured to monitor and determine the type of processing device (e.g., torch) being used therein. For example, the power supply can additionally or alternatively include an identification module (e.g., a torch identification module) to communicate with the torch. In some cases, the torch identification module can include a data reading device (e.g., an RFID reading device) disposed within or in communication with the power supply.

Additional information regarding communicating with and identifying consumable components installed in a material processing system (e.g., thermal processing system) can be found in U.S. patent application Ser. No. 13/838,919 entitled, "Systems, Methods, and Devices for Transmitting Information to Thermal Processing Systems," the contents of which are hereby incorporated by reference in their entirety.

As mentioned above, in some embodiments, the communication module 110 is configured to transmit information relating to the consumable component to the communication network 112. As discussed below, such information can be used for any of various reasons including troubleshooting the material processing system or for analyzing system usage for providing additional services. In particular, the communication network can be used to transmit information regarding what type (e.g., what brand) of consumable components are being used by the material processing system during use. For example, the communication network can analyze and determine how often a particular type (e.g., brand or manufacturer) of consumable components are used by the material processing system relative to other types of consumable components. The communication network can include one or more systems that are configured to permit the third party 114 to analyze the types of consumable components that have been used by the material processing system 100. In some embodiments, the communication network 112 can include a computing system that the third party 114 can use to obtain information about the material processing system usage. For example, the material processing system 100 (i.e., and communication network 112) can be configured to track and/or record the types of consumable components used in the torch 102 during various processing operations.

Periodically, the third party can access the communication network 112 to review, study, and/or download the usage information to determine if the user's usage indicates that the user meets a certain predetermined level of usage loyalty (i.e., loyalty to the third party) in accordance with an agreement between the user and the third party. For example, the third party 114 can physically visit the user's work area (e.g., factory or similar manufacturing facility) and manually use the communication network 112 to access and extract the usage information. In some cases, the third party 114 could download the usage information to a memory device (e.g., a USB jump drive or similar portable memory storage device). However, other configurations are possible. In some examples, the third party 114 includes a client device (e.g., an external computing device) in communication (e.g., wired or wireless communication) with the communication network 112 that can be used to extract usage information.

As discussed below, the material processing systems can include other communication networks having any of various types of systems and communication techniques to permit the third party to access the user's usage information.

Figure 2:
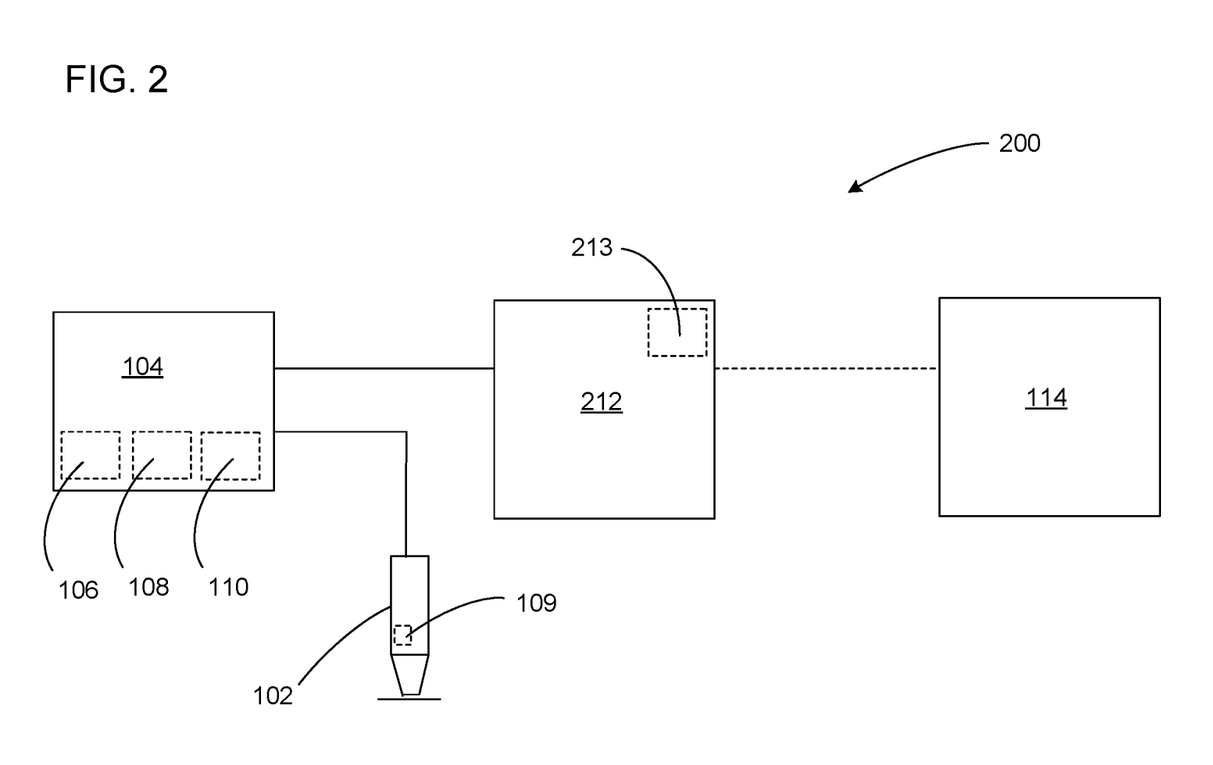
FIG. 2 is a schematic diagram of an example material processing system having a telecommunications based communication network to transmit usage information to a third party.

In some embodiments, referring to FIG. 2, a material processing system 200 can alternatively or additionally include a communication network 212 that utilizes cellular telephone based telecommunication networks (e.g., mobile telecommunication technology systems). The communication network 212 can be integrated within or in communication with the power supply 104 to transmit information from the power supply 104 to the third party 114. For example, the communication network 212 can include a telecommunication antenna (e.g., a mobile telecommunication antenna) 213 in communication with the power supply 104 (e.g., with the communication module 110), by which information can be transferred to the third party 114. In some cases, the antenna is in the form of a 3G-type mobile telecommunications antenna in wireless communication with the power supply and can broadcast a signal to be received by the third party 114. In some examples, the antenna can be disposed as an integral component within the power supply 104.

Figure 3:
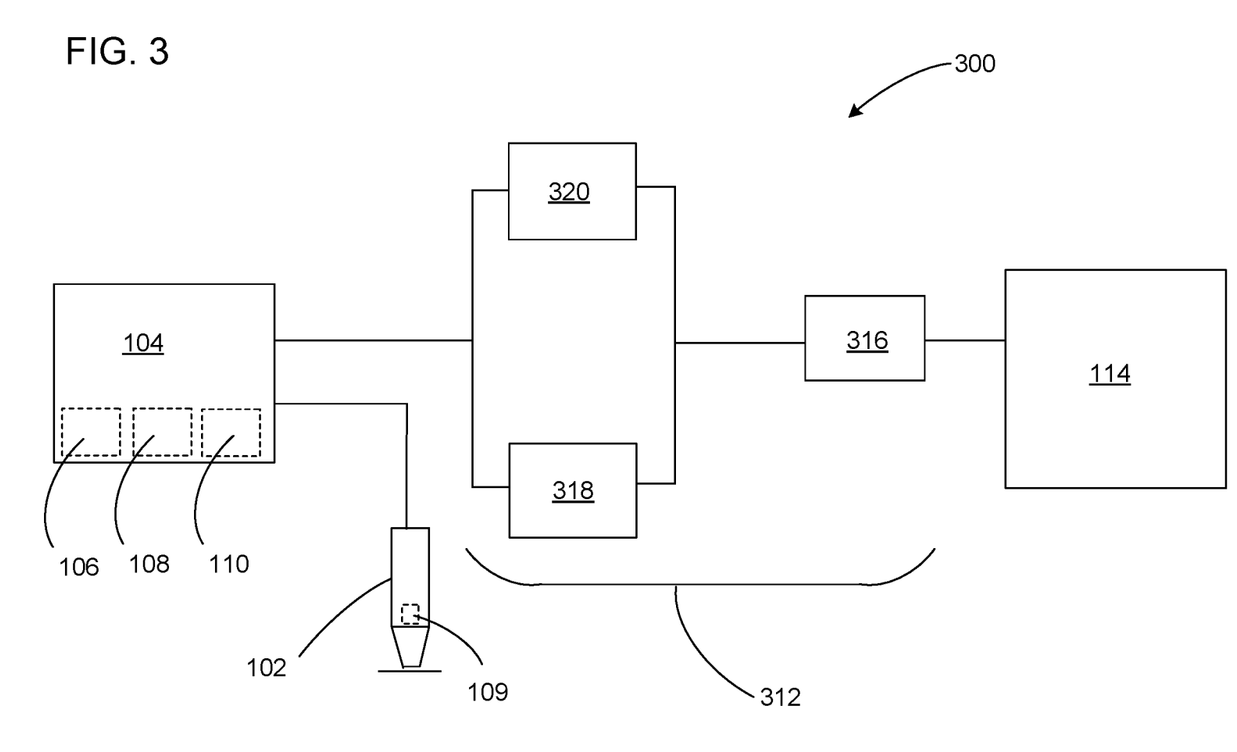
FIG. 3 is a schematic diagram of an example material processing system having a communication network that includes an Internet accessible computer system to transmit usage information to a third party.

In some embodiments, referring to FIG. 3, a material processing system 300 can alternatively or additionally include a communication network 312 that is in communication with the Internet to communicate with the third party 114. For example, the communication network 312 can include an Internet based cloud network system 316 configured to transmit material processing system usage information relating to the type of consumable components used to the third party 114. The communication network 312 can include one or more devices in communication with the power supply 104 (e.g., with the communication module 110). Such devices can include a torch controller system (e.g., a computer numerical controller (CNC)) 318 used to control movement of the processing device 102 during use and a computing system (e.g., a production floor personal computer) 320 used to operate various components of the material processing system 300 that, using the Internet based cloud system, can be placed in communication with the third party 114. The third party 114 is also in communication with the Internet based cloud system 316 to receive usage information about the material processing system 300. As discussed above, the third party 114 can include a computing device accessible by a third party representative (e.g., a representative of the manufacturer of the material processing system, power supply, processing device or consumable components used within the system). In some embodiments, the communication network 312 can include a local area network (LAN) in communication with the power supply 104, the computer numerical controller 318, the computing system 320, and/or the third party 114.

The material processing systems described herein (e.g., the material processing system 100, 200, or 300) can be used to carry out any of various different system management, material processing, or customer service methods or processes.

Figure 4:
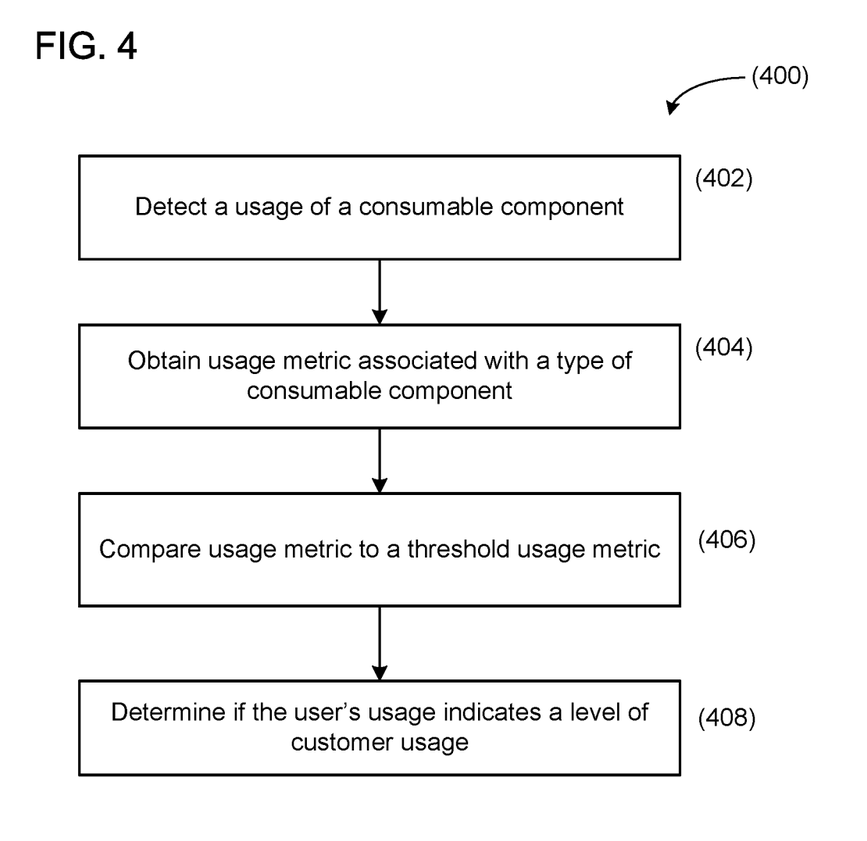
FIG. 4 is a flow chart depicting an example method for validating customer characteristics associated with a user's usage of consumable components within a material processing system.

For example, in some aspects, the material processing systems can be used to track and determine how much a certain type of consumable component (e.g., a certain manufacturer of consumable component(s)) is used by the material processing system relative to other types of consumable components (e.g., consumable components of other manufacturers). This information can be useful to third parties (e.g., consumable component manufacturers) because, in some cases, the third party may provide products or services at reduced (discounted) costs to users based on the users using components (e.g., consumable components) that are manufactured only by the manufacturer. For example, in some embodiments, a method (400) for validating a customer characteristic (e.g., a customer loyalty to a certain type of consumable component) associated with a user's usage of a replaceable consumable component within a material processing system can first include detecting a usage of a consumable component within the material processing system. (402) For example, a computing system (e.g., the power supply 104) can be used to detect a usage of one or more consumable components installed and used within a material processing device (e.g., the torch 102). In some embodiments, a consumable identification device (e.g., the consumable identification module 109) can communicate with a signal device disposed on the consumable components to detect the consumable installed in the torch.

Next, a usage metric (e.g., a usage ratio) of the material processing system associated with the usage of the one or more replaceable consumable components used within the material processing system can be obtained (e.g., collected (e.g., automatically collected)). (404) For example, the usage metric can be associated with the usage of a certain type (e.g., specific or preferred type) of consumable components within the material processing system. The usage metric can be obtained (e.g., by the third party) using the various systems and devices, such as the communication network 112, telecommunication communication network 212, the Internet cloud-based communication network 312, and/or other suitable communication networks that are configured to transmit information relating to usage of the processing device (e.g., torch) 102 using the consumable identification module 109, power supply 104, the control unit 106, the usage tracking module 108, or the communication module 110.

In some embodiments, obtaining the usage metric includes determining a frequency of use of a specific type (e.g., a preferred type (e.g., a certain manufacturer, OEM, or channel source)) of consumable component based on identification of the consumable component installed in the material processing system (e.g., in the processing device). For example, obtaining the usage metric can include determining a ratio that the preferred type of consumable component is used relative to a total usage of the material processing system. That is, the amount that the preferred type of consumable component is used relative to the amount that the non-preferred type of consumable is used in place of the preferred type of consumable can be determined. For example, the usage metric can include a percentage of time that the material processing system is used with the preferred type of consumable relative to other consumables.

Obtaining the usage metric can include repeatedly determining (e.g., periodically tracking) whether or not a consumable component of the preferred type is installed in the material processing system during usage. In some cases, determining whether or not a consumable component of the preferred type is installed in the material processing system during usage includes identifying the consumable component installed in the material processing system. For example, identifying the consumable component can include communicating with a signal device (e.g., a data tag) disposed in or on the consumable component. Additionally or alternatively, the consumable component can be identified by directing a fluid flow through a flow-restriction element of the consumable component and measuring a flow characteristic of the fluid flow therethrough.

Obtaining the usage metric can include communicating (e.g., using RFID technology) with the consumable component during use. For example, communicating with the consumable component during use can include reading a data tag (e.g., a radio-frequency identification (RFID) device) disposed in or on the consumable component, where the data tag contains identifying information relating to the consumable component.

In some embodiments, obtaining the usage metric can include receiving usage data from an Internet based source (e.g., the communication network 112 or 312) or broadcasting usage data to an Internet based source. In some embodiments, the obtaining the usage metric can include receiving usage data from a mobile telecommunication network (e.g., the communication network 212). In some cases, the obtaining the usage metric can include obtaining other system cutting information (e.g., system operating (e.g., cutting) parameters) including a time duration during which the system was operated using unidentified consumables, material thickness of material being cut or welded, number of system starts, arc hours of system operation, and other cutting information.

In some embodiments, the method can also include determining if the material processing system is properly configured based on the consumable component determined as being installed within the material processing system. For example, in some embodiments, the material processing system can access information from the consumable component that provides system setup instructions based on the type of consumable installed in the torch. For example, in some cases, the method can include determining if a gouging nozzle is installed in a torch when the material processing system is programmed to perform a gouging operation.

In some cases, obtaining a usage metric includes the system determining that it is unable to communicate with a particular consumable component during use. That is, a material processing system may be configured to communicate with preferred consumable components during recommended or authorized uses (e.g., any or all authorized uses) of the system and therefore, if the system determines that its processing device (e.g., torch) is being operated but the system cannot communicate with any consumable components, it can be determined that the preferred type of consumable components are not being used by the user during such monitored use. In particular, some consumable components are required for proper operation of the processing device (e.g., the electrode and the shield of a torch, a lens of a laser cutting head, or an orifice of a water-jet cutting head), so if the processing device is being operated but the system cannot communicate with any consumable components, the system can determine that the processing device is being operated without using the preferred type of consumable component.

As discussed above, the material processing system can utilize the communication module and/or the consumable identification module to communicate with the consumable components during use of the processing device to monitor and track the type of consumable component in use. The power supply (e.g., the control unit or the usage tracking module) and the communication network can track and compile such usage information in order to form/determine the usage metric. By way of a non-limiting example for illustration purposes, if the material processing system determines that its processing device has been operated for 100 hours in total and the preferred type of consumable component was being used for 50 hours, then the usage metric would be 50% based on the 50 hours out of the total 100 hours. Similarly, if the preferred type of consumable was in use during the total 100 hours of usage, then the usage metric would be 100%.

The usage metric obtained from the communication network can then be compared to a threshold usage metric (406). In some embodiments, the usage metric can be compared using the power supply (e.g., the usage tracking module 108) or an external computing system. For example, the comparing the usage metric can include determining a ratio (e.g., a time ratio) that the specific (e.g., preferred) type of consumable component is used relative to a total usage of the material processing system. In some embodiments, the comparing the usage metric can include repeatedly determining (e.g., periodically tracking) whether or not a consumable component of the specific type is installed in the material processing system during usage. In some embodiments, the threshold usage metric represents a desired amount of time that the third party anticipates, expects, or requires the preferred type of consumable component to be used by the user relative to non-preferred types of consumable components. For example, the user of the material processing system may have an agreement with a third party manufacturer of consumable components that provides preferential treatment based upon certain usage metrics. In some cases, a user may agree to use a material processing system provided by the third party according to one or more usage metrics. For example, the threshold usage metric can include using the preferred type of components at least 50% of the total usage time (e.g., at least 60%, at least 75%, at least 85%, at least 90%, at least 95%, 100%). In some cases, the threshold usage metric may be based on a national and/or international average usage of the preferred type of components, this average being generated by monitoring users on a given material processing system provided by the third party. That is, in some embodiments, a user may receive beneficial treatment if their usage meets or exceeds a national and/or international average usage of the preferred type of components by other users.

With the collected usage metric compared to the threshold usage metric, it can be determined if the user's usage indicates a predetermined level of customer usage (e.g., customer loyalty) (408). That is, if the user's usage meets or exceeds the threshold metric, then it can be determined that the user is using the preferred type of consumable component in accordance with the third party's direction or agreement. For example, if the threshold usage metric was 75% but the obtained usage metric was only 50%, then it would be determined that the user's usage fails to indicate the predetermined level of customer loyalty. Therefore, the third party may elect to not provide beneficial treatment to the user. Alternatively, if the threshold usage metric was 75% and the obtained usage metric was 90%, then it would be determined that the user's usage indicates the predetermined level of customer loyalty. The example values for usage metrics provided herein are merely non-limiting examples for illustration purposes only and can be any of various other values based on the user and the third party.

In some embodiments, in response to determining that the user's usage indicates the predetermined level of customer loyalty, a user can be provided with one or more benefits. In some cases, based on the customer loyalty determined by the user's usage, the third party (e.g., the manufacturer or seller of one or more of the components of the material processing system) can provide the user with one or more benefits. For example, the benefits can include discounted equipment purchasing options (e.g., warranties, discounts on spare parts, discounted (e.g., free) material processing systems (e.g., power supplies or processing devices), or discounted system upgrade options). Alternatively or additionally, the benefits can also include one or more discounted service options (e.g., system service contracts, system training visits, or semi-automated (e.g., automated) consumable component replacement services based on receiving information that a consumable has reached its end of life usage). In some embodiments, the benefits based on the user's usage can be graduated, for example, as a percentage of use. For example, as the percentage of the user's usage increases, more (e.g., greater quantity or greater monetary value) benefits can be offered or provided to the user. In some cases, graduated usage levels can be established at any of various percentages. By way of an example, graduated levels can be set at 70%, 80%, 90%, and 100%, where additional benefits are made available at each increasing graduated level.

The material processing systems described herein can also be used by a user to assert that their usage meets or exceeds a threshold usage level set by the third party, for example, the predetermined level of customer loyalty.

Figure 5:
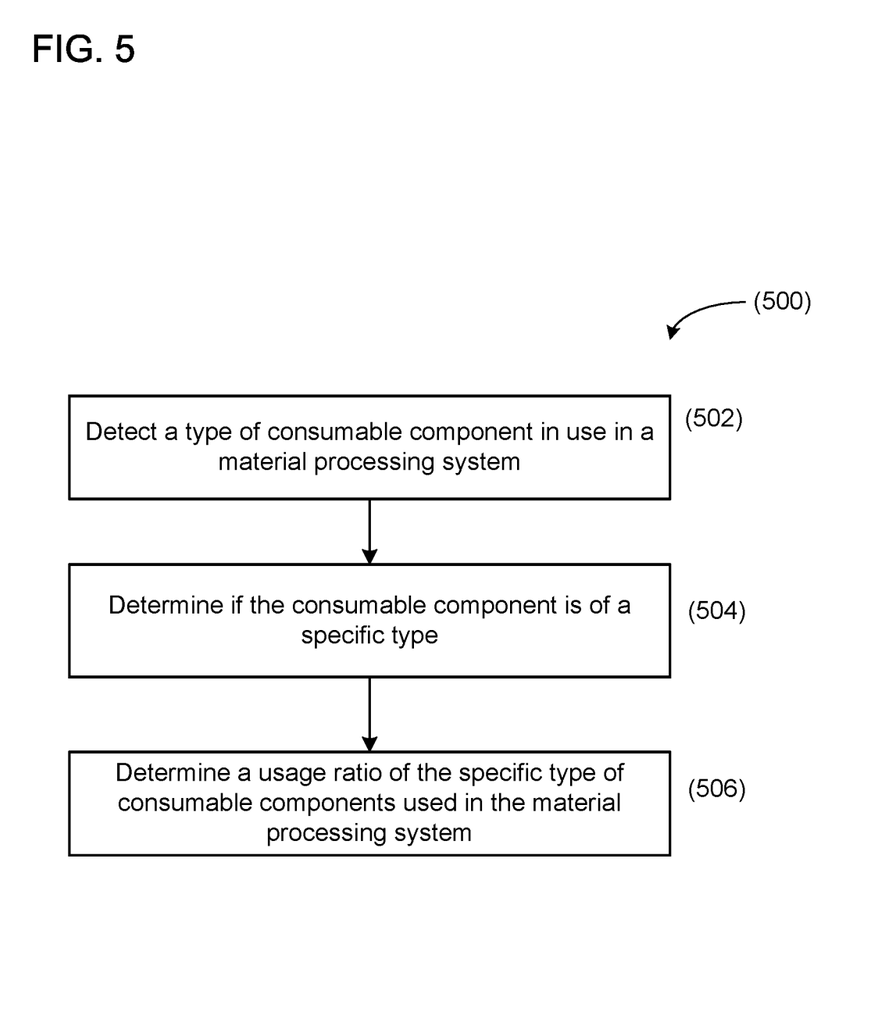
FIG. 5 is a flow chart depicting an example method for asserting customer loyalty based on usage of one or more replaceable consumable components within a material processing system.

For example, in some aspects, a method (500) for asserting a level of usage of one or more replaceable consumable components within a material processing system (e.g., the material processing systems 100, 200, 300) can first include detecting a type of consumable component in use within a material processing system (e.g., within a processing device (e.g., the torch, water-jet cutting head, laser cutting head, or other processing device) 102). (502) As discussed above, in some embodiments, a consumable component can include a signal device (e.g., an RFID device) with which one or more components the material processing system (e.g., the consumable identification module 109) can communicate to identify the consumable component and the type of consumable component can be detected by communicating with the signal device. In some cases, as discussed above, the signal device includes identifying information relating to the consumable component.

The signal device is generally arranged within the respective component in order to help aid in the communication between the signal device and the receiver (i.e., the consumable identification module 109). For example, each signal device is typically positioned relatively close to the receiver with which it is intended to communicate. While the permitted spacing between a receiver and a signal device can vary based on the types of devices being used and the type and amount of material surrounding or otherwise in the vicinity of the devices, the signal devices described herein are typically separated from a receiver by a spacing that is about 0 mm to about 10 mm (e.g., about 3 mm to about 6 mm). Additionally, the spacing between the receiver and the various signal devices with which the receiver communicates is typically unobstructed by other components (i.e., little or no material (e.g., no metal material) is disposed in the spacing) to enable or improve communication capabilities between the RFID reader and the signal devices with which is communicates. That is, obstructions (e.g., metal pieces) in between a receiver and signal devices can inhibit (e.g., prevent) effective communication between the devices, so such obstructions are typically avoided. To help enable effective communication between a signal device and a receiver, components that are disposed between the signal device and the receiver (e.g., the baffle of the shield retaining cap) can be formed of non-metal materials, such as one or more of a variety of plastic materials.

Next, it can be determined if the type of the consumable component is a specific predetermined (e.g., preferred) type of consumable component (504). For example, it can be determined if the consumable component in the material processing system is a particular manufacturer or OEM type. In some cases, the power supply or communication network can read the identifying information from the consumable component and compare it to expected identifying information values for the preferred type of consumable component. As discussed above with respect to the method 400, in some embodiments, it can be determined that the consumable component in use is not of the preferred type simply by determining that it cannot be communicated with. That is, if the preferred type of consumable component is configured to establish communication with the power supply during use, the lack of such communication can be interpreted as the consumable being a non-preferred type.

Additionally, a usage metric (e.g., a usage ratio) of the predetermined type of consumable component used within the material processing system relative to other types of consumable components can be determined (506). For example, as discussed above, the usage metric (e.g., usage ratio) can be a ratio of the amount of time that a predetermined (e.g., preferred) type of consumable component is used within the material processing system relative to a cumulative time period of total use of the material processing system. In some cases, determining the usage ratio includes determining a frequency of use of the predetermined type (e.g., manufacturer, OEM, or channel source) of consumable component relative to a frequency of use of consumable components that are not of the predetermined type.

In some examples, determining the usage ratio includes determining a percentage of time (e.g., arc hours) that a first type (e.g., the predetermined (e.g., preferred or specific) type) of consumable component is used relative to a usage of a second type (e.g., non-specific or non-preferred type) of consumable in place of the predetermined type of consumable. Determining the usage ratio can also include determining (e.g., periodically tracking) whether or not a consumable component of the preferred type is installed in the material processing system during usage. In some embodiments, the determining the usage ratio can include determining a number of starts during which the first type of consumable component is used relative to the number of starts during which a second type of consumable is used rather than (e.g., in place of) the first type of consumable.

In some embodiments, determining whether or not a consumable component of the predetermined (e.g., preferred) type is installed in the material processing system during usage comprises identifying the consumable component installed in the material processing system. For example, as discussed above, identifying the consumable component can include communicating with a signal device (e.g., an RFID data tag) disposed in or on the consumable component. In some cases, as discussed above (e.g., with respect to the method 400), identifying the consumable component and obtaining a usage metric can include the system determining that it is unable to communicate with a particular consumable component during use. Based on the lack of expected communication with a particular consumable component, the system can determine that the preferred type of consumable is not installed in the processing device during the use. Additionally or alternatively, identifying the consumable component can include directing a fluid flow through a flow-restriction element of the consumable component and measuring a flow characteristic of the fluid flow therethrough.

The method 500 can also include communicating the determined usage ratio to an external computing system in communication with a client device (e.g., a third party client device). In some cases, determining the usage ratio includes transferring information regarding the type of consumable component in use to an external computing device (e.g., the computing system (power supply 104), the communication networks 112, 212, 312, the third party client device 114, or one or more other computing devices). As discussed above, the material processing system can utilize the consumable identification module to communicate with the consumable components during use of the processing device to monitor and track the type of consumable component in use. Over time, the power supply (e.g., the control unit 106 and/or the usage tracking module 108) and the communication network can track and compile such usage information in order to form/determine the usage metric.

As discussed above (e.g., with respect to method 400), based on the determined usage metric of the user, the third party can consider the customer loyalty of the user. If the customer's usage metric meets or exceeds a threshold usage metric, it can be determined that the user meets a certain, predetermined level of usage (e.g., loyalty), which may be defined by an agreement between the user and the third party. Also as discussed above, if the user's usage indicated the predetermined level of loyalty, then the third party may provide the user with one or more beneficial treatments including discounted products or services.

The methods described herein can also include supplying information relating to use of the processing device during one or more prior operational sequences to a computing system (e.g., to the power supply) or to the third party. In addition or alternatively to monitoring use of the material processing system to enable the third party to provide benefits to a user, the systems and methods described herein can be used for monitoring and tracking warranty information relating to the material processing system. That is, third parties can utilize the systems described herein to review and validate warranty claims made by a user of the material processing system.

For example, as discussed herein, information can be exchanged (e.g., written) between the power supply or the processing device and the consumable installed within the processing device to record or otherwise document the usage of the system. In some embodiments, information can be provided to or otherwise stored on a signal device (e.g., an RFID tag) installed in or on a processing device (e.g., torch) or power supply relating to the usage of the material processing system. Then, if the material processing system is returned to a third party (e.g., as being damaged, returned for service, submitted for a warranty claim, or returned for another reason), the third party can access the signal device to review the stored information to understand the conditions in which the material processing system has been operated by the user. With the knowledge and better understanding of how the material processing system has been used (e.g., in accordance with or violation of a user agreement), the third party can make educated decisions regarding how to treat the user. For example, a third party may opt to not honor a warranty claim if it can be determined or established that the user violated a user agreement when using the system.

In some cases, the information can include conditions, such as power levels or gas flow provided to a processing device (e.g., a torch) during a failure scenario of the processing device. The information can include a number of hours during which the material processing system has been used, for example, to determine that the system has been used for more hours than authorized. In some embodiments, the information can include, for example, the number of different consumables (e.g., types, OEMs, or total number of consumables) that were used in the processing device during a specified time. In some cases, the specified time can include the life of the processing device. In some cases, the information can include a number of start sequences that the processing device has undergone during a specified time (e.g., its lifetime).

While the systems and methods herein have generally been described as including or being used with certain types of material processing systems, such as plasma arc processing systems, the material processing systems can additionally or alternatively include any of various other types of systems including laser processing systems, water-jet processing systems, or other types of systems. Additionally, the methods discussed herein can be executed in association with any of various other types of material processing systems including laser processing systems, water-jet processing systems, or other types of systems.

While various embodiments have been described herein, it should be understood that they have been presented and described by way of example only, and do not limit the claims presented herewith to any particular configurations or structural components. Thus, the breadth and scope of a preferred embodiment should not be limited by any of the above-described exemplary structures or embodiments, but should be defined only in accordance with the following claims and their equivalents.

What is claimed:

1. A method of operating a thermal processing system having a cutting head with a consumable component installed therein, the method comprising:
   providing the thermal processing system including the cutting head connected to a power supply and a microprocessor, the cutting head including a reading device configured to receive radio-frequency signals, the microprocessor configured to control operations of the power supply and the cutting head, the microprocessor being in electrical communication with an internet-based cloud-computing network, the thermal processing system being one of a plasma cutting system or a laser cutting system;
   installing the consumable component in the cutting head, the consumable component having an RFID device, the RFID device being configured to store data about the consumable component;
   positioning the RFID device in the cutting head upon installation of the consumable component in the cutting head to maintain an unobstructed signal communication path to the reading device in the cutting head such that the RFID device is readable by the reading device while the consumable component is inside the cutting head;
   cutting a workpiece using a beam or arc generated by the thermal processing system in a cutting operation;
   reading the stored data about the consumable component from the RFID device by the reading device in the cutting head; and
   transmitting, by the reading device while the RFID device and the reading device are in the cutting head, the stored data about the consumable component installed in the cutting head to the microprocessor that is configured to forward the stored data to the internet-based cloud-computing network.

2. The method of claim 1, wherein the cutting head comprises a plasma torch or a laser cutting head.

3. The method of claim 1, wherein the data about the consumable component comprises at least one of a duration the thermal processing system was operated, an identification of the consumable component, a number of starts performed by the consumable component, or an hours of operation of the consumable component.

4. The method of claim 1, further comprising analyzing usage information about the consumable component using the internet-based cloud-computing network.

5. The method of claim 1, further comprising accessing the internet-based cloud-computing network to receive the stored data about the consumable component.

6. A method of operating a thermal processing system that includes a cutting head with a consumable component, the method comprising:
   providing the thermal processing system including the cutting head connected to a power supply and a microprocessor, the cutting head including a reading device configured to receive radio-frequency signals, the microprocessor configured to control operations of the power supply and the cutting head, the microprocessor being in electrical communication with an internet-based cloud-computing system;
   installing the consumable component inside of the cutting head of the thermal processing system upon which an RFID tag of the consumable component is positioned in the cutting head to maintain an unobstructed signal communication path to the reading device in the cutting head;
   generating, by the cutting head, a cutting beam or arc during a cutting process by the cutting head;
   cutting a workpiece using the cutting beam or arc during the cutting process;
   reading, by the reading device, cutting data of the consumable component from the RFID tag disposed in the cutting head along the unobstructed signal communication path while the consumable component is inside of the cutting head;
   communicating, by the thermal processing system, the cutting data for the consumable component to the internet-based cloud-computing system; and
   analyzing the cutting data using the internet-based cloud-computing system to determine at least one of usage history of the consumable component or an identifier of the consumable component.

7. The method of claim 6, wherein the reading device and the RFID tag are disposed in the cutting head.

8. The method of claim 6, further comprising reading, by the reading device, the cutting data for the consumable component from the RFID tag during the cutting process.

9. The method of claim 6, wherein the cutting head comprises a plasma torch or a laser cutting head.

10. The method of claim 6, wherein the cutting data for the consumable component comprises at least one of a duration the thermal processing system was operated, an identification of the consumable component, a number of starts performed by the consumable component, or an hours of operation of the consumable component.

11. The method of claim 6, wherein communicating the cutting data for the consumable component to the internet-based cloud-computing system comprises communicating, by at least one of the microprocessor or a communication module disposed in the power supply of the thermal processing system, the cutting data to the internet-based cloud-computing system.

12. The method of claim 6, further comprising accessing the internet-based cloud-computing system to receive at least one of the usage history of the consumable component or the identifier of the consumable component.

13. The method of claim 1, wherein the cutting head is a plasma torch cutting head.

14. The method of claim 6, wherein the cutting head is a plasma torch cutting head.

\* \* \* \* \*